May 26, 1925.

J. W. TORRANCE ET AL 1,539,527

ELECTRIC GENERATOR

Filed June 13, 1921     2 Sheets-Sheet 1

INVENTOR

May 26, 1925. 1,539,527
J. W. TORRANCE ET AL
ELECTRIC GENERATOR
Filed June 13, 1921  2 Sheets-Sheet 2
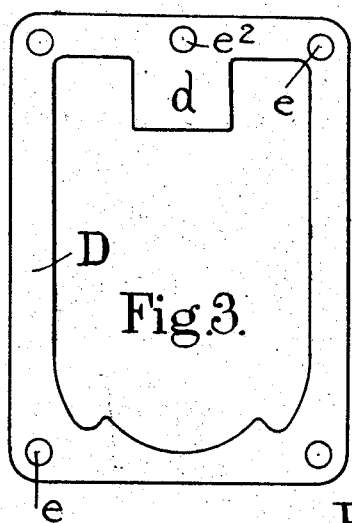
Fig.3.
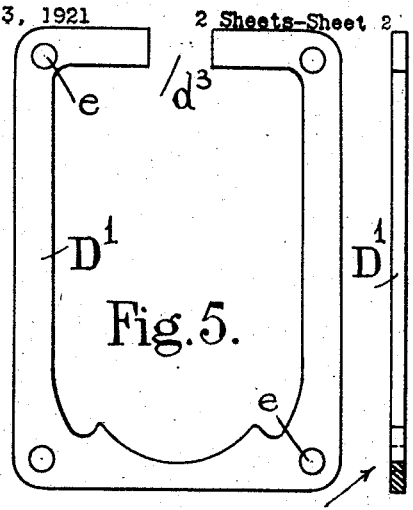
Fig.5.
Fig.4.
Fig.6.
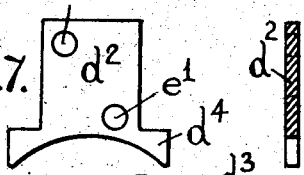
Fig.7. Fig.8.
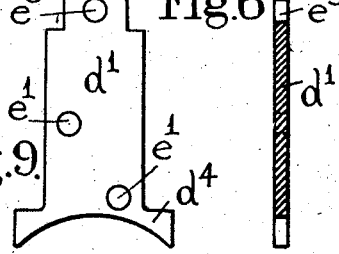
Fig.9.
Fig.10.
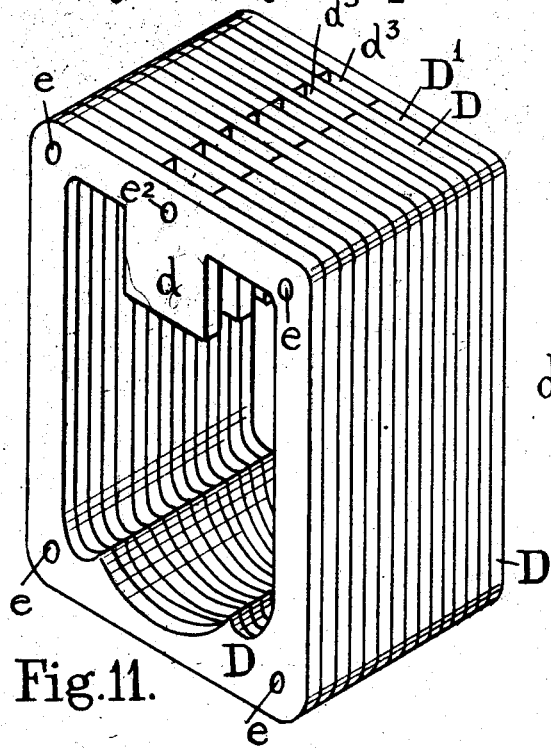
Fig.11.
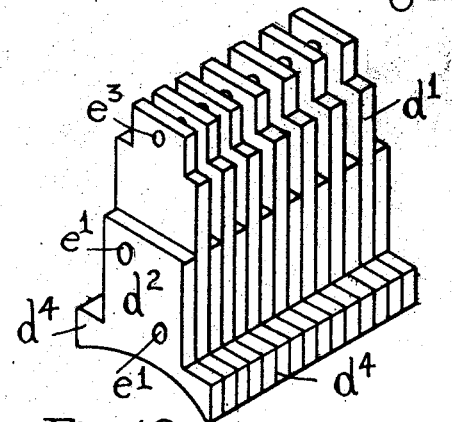
Fig.12.
INVENTOR
J. W. Torrance
J. McK. Torrance
by Torrance O'Brien
attys.

Patented May 26, 1925.

1,539,527

UNITED STATES PATENT OFFICE.

JAMES WALKER TORRANCE AND JOHN McKINNON TORRANCE, OF FAILSWORTH, ENGLAND.

ELECTRIC GENERATOR.

Application filed June 13, 1921. Serial No. 477,163.

*To all whom it may concern:*

Be it known that we, JAMES WALKER TORRANCE and JOHN McKINNON TORRANCE, both British subjects, residing both at Failsworth, Lancashire, England, have invented certain new and useful Improvements in Electric Generators, of which the following is a specification.

This invention relates to electric generators suitable for the electric lighting of vehicles and other purposes where a compact and light weight electric generator or dynamo is desired.

It has already been proposed to build up the field magnets of electric generators or electric motors from a number of thin or sheet metal stampings or plates, each in two or more parts and of such a shape as in assembling to interlock or overlap at the joints.

According to the present invention the field magnet system which is constructed of metal plates or stampings bolted together each in two or more parts which in assembling overlap and break joint, also form the frame of the generator, although it may be surrounded by a light casing, the stampings being constructed with holes to receive studs for clamping the stampings rigidly together and also to bolt thereto the end plates carrying the armature bearings, brush gear, automatic electromagnetic relay and terminals.

This invention comprises an improved construction of the plates for a two pole generator with a single field coil, or a four pole generator the plates being so shaped that the frame members and the coil members of the plates can be assembled separately, a coil wound on a former placed on the latter and then fitted into position and secured to the frame members, one plate overlapping the adjacent one at the joint and breaking joint.

The invention will be fully described with reference to the accompanying drawings.

Fig. 3 is a side elevation of one of the stampings to form the field magnets.

Fig. 4 is a transverse section of the same.

Fig. 5 is a side elevation of the other stamping to form the field magnets.

Fig. 6 is a transverse section of the same.

Fig. 7 is a side elevation of stamping for pole piece to fit the stamping shown in Figs. 3 and 4.

Fig. 8 is a transverse section of the same.

Fig. 9 is a side elevation of stamping for pole piece to fit the stamping shown in Figs. 5 and 6.

Fig. 10 is a transverse section of the same.

Fig. 11 is a perspective view showing the stamping forming the field magnets assembled.

Fig. 12 is a perspective view showing the stamping forming the pole pieces assembled.

Figure 1:
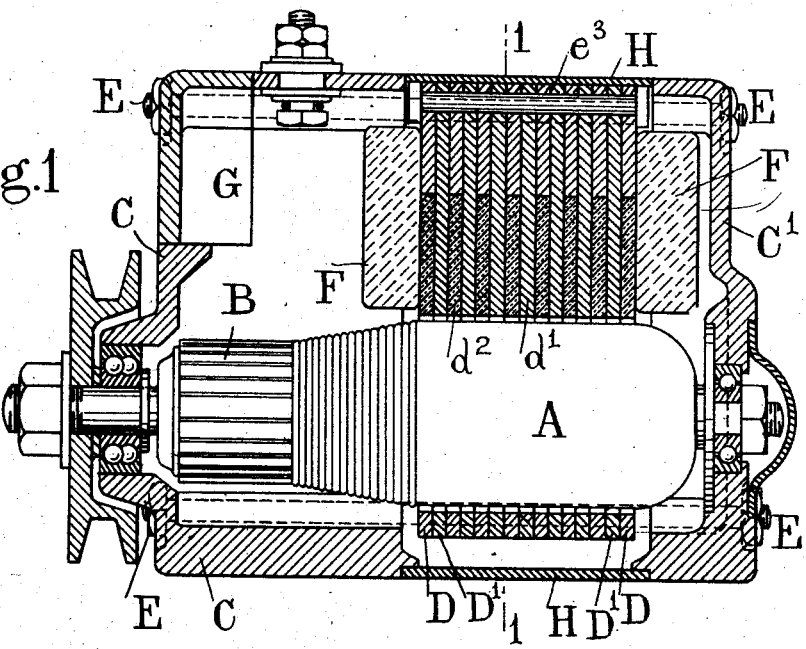
Fig. 1 is a longitudinal sectional elevation of a two pole generator with a single field coil.
Figure 2:
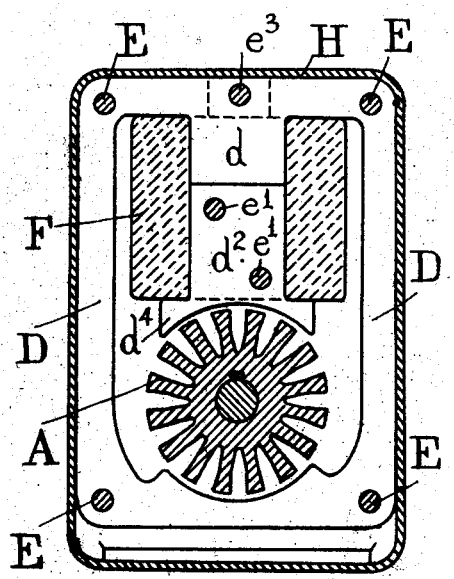
Fig. 2 is a transverse section on line 1—1.

The armature A of the generator and commutator B are of ordinary construction mounted on ball bearings in end plate castings C C′, preferably of aluminium.

The field magnet system is built up of a number of stampings or plates D D′, in the shape of a rectangular frame with coil members projecting inwardly and centrally therefrom laid side by side in layers and bolted or riveted together, each layer being in two parts of such a shape that one layer will interlock with and break joint with the adjacent layer to give an efficient magnetic contact.

As shown in the drawing for a two pole magnet the plates are made in two sets D D′, a plate D of the one set alternating with the plate D′ of the other set. The plates D are each made with the coil member $d\ d^2$ in two parts, the part $d$ being integral with and projecting inwardly and centrally from the frame member D and the part $d^2$ separate therefrom to complete the coil member, and the plates D′ are each made with the coil member $d'$ in one piece but separate from the frame member D′, a gap $d^3$ being formed therein to receive the end of the coil member $d'$ which when in place will project inwardly and centrally within the frame or pole member.

The coil members are preferably made enlarged at the ends $d^4$ (somewhat of T shape) to form a pole shoe adjacent to the armature A.

The field coils F are of ordinary construction being wound upon a former or mandril of the desired shape.

In assembling the plates or frame members D D′ are placed together alternately and bolted in position through the holes $e$ as shown in Fig. 11 and the coil members $d^2$ and $d'$ are similarly placed together alternately as shown in Fig. 12 and are firmly secured by rivets $e'$. A field coil wound on a former is placed upon the core members $d^2$ $d'$ and the free ends of the coil members are pushed into position between the frame members D D′, the ends of the members $d'$ entering the gaps in the plate D′ and the ends of the members $d^2$ abutting against the ends of the members $d$. A bolt or rivet is passed through the holes $e^2$ and $e^3$ to secure the members together. The whole is then assembled as shown in Fig. 1 and secured by bolts E to the end plate castings C C′. A casing H may be fitted over the plates between the end castings C C′.

The stampings or plates are of soft iron or low carbon mild steel, but in order to retain sufficient residual magnetism in the magnetic circuit, a proportion of the stampings or plates employed can be of steel of such a quality as to have a good magnetic retentivity in order to self excite and generate after standing.

A space may be provided at G for an automatic cutout (not shown) within the casing or a cutout or automatic switch to cut in and out as the voltage rises and falls may be attached in any convenient position if desired.

By this construction a specially lightweight and compact electric generator can be produced, the field magnets being of stampings designed to allow sufficient iron for the required output, and in two or more parts to permit of coils wound on a former being placed in position during assembly, and end plates C C′ carrying the armature bearings, the whole being tied together and braced by stay rods or bolts.

What we claim as our invention and desire to protect by Letters Patent is:—

In a field magnet system for electric generators built up of a number of plates or stampings the combination with a magnetic coil of a set of plates of approximately rectangular shape with holes in the corners, a second set of plates of approximately rectangular shape with holes in the corners and a gap formed along one edge, the second set of plates alternating with the first set, a depending member projecting inwards from each of the plates of the first set, a set of coil carrying plates, a second set of coil carrying plates alternating with the first, means for clamping the two sets of coil carrying plates together, means for clamping the coil carrying plates to the frame plates, pole shoes formed on the ends of the coil carrying plates, end plates and bolts passing through the end plates and the holes in the approximate rectangular plates to clamp the latter to the end plates.

In testimony whereof we have hereunto set our hands in presence of two subscribing witnesses.

JAMES WALKER TORRANCE.
JOHN McKINNON TORRANCE.

Witnesses:
J. Owden O'Brien,
Geo. H. O'Brien.